United States Patent [19]

Besenfelder et al.

[11] 3,872,431
[45] Mar. 18, 1975

[54] APPARATUS FOR DETECTING DATA BITS AND ERROR BITS IN PHASE ENCODED DATA

[75] Inventors: Edward R. Besenfelder, Phoenix, Ariz.; Stanley I. Friedman, Oklahoma City, Okla.

[73] Assignee: Honeywell Information Systems, Inc., Waltham, Mass.

[22] Filed: Dec. 10, 1973

[21] Appl. No.: 423,025

[52] U.S. Cl. ............................ 340/146.1 AX, 340/146.1 F, 340/146.1 R; 360/53
[51] Int. Cl. .............................. G11b 27/36
[58] Field of Search............ 340/146.1 AX, 146.1 F, 340/146.1 R; 360/53; 307/220; 328/104

[56] References Cited
UNITED STATES PATENTS

| | | |
|---|---|---|
| 3,142,829 | 7/1964 | Comstock ............................ 360/53 |
| 3,273,120 | 9/1966 | Dustin et al. ..................... 360/53 X |
| 3,586,877 | 6/1971 | Aridas ................................. 328/104 |
| 3,685,015 | 8/1972 | Bocek ........................... 340/146.1 F |

Primary Examiner—Malcolm A. Morrison
Assistant Examiner—R. Stephen Dildine, Jr.
Attorney, Agent, or Firm—Edward W. Hughes

[57] ABSTRACT

A plurality of binary-to-decimal converters, logic gates and inverters provide a signal to a first output terminal when at least one error occurs in a data character, provide a signal to a second output terminal when only one error occurs in the character and provide a signal to a third output terminal when at least two errors occur in the character.

4 Claims, 2 Drawing Figures

| INPUTS | | | | OUTPUTS | | | | | | | | |
|---|---|---|---|---|---|---|---|---|---|---|---|---|
| A | B | C | D | 0 | 1 | 2 | 3 | 4 | 5 | 6 | 7 | 8 |
| L | L | L | L | L | H | H | H | H | H | H | H | H |
| H | L | L | L | H | L | H | H | H | H | H | H | H |
| L | H | L | L | H | H | L | H | H | H | H | H | H |
| H | H | L | L | H | H | H | L | H | H | H | H | H |
| L | L | H | L | H | H | H | H | L | H | H | H | H |
| H | L | H | L | H | H | H | H | H | L | H | H | H |
| L | H | H | L | H | H | H | H | H | H | L | H | H |
| H | H | H | L | H | H | H | H | H | H | H | L | H |
| L | L | L | H | H | H | H | H | H | H | H | H | L |
| H | L | L | H | H | H | H | H | H | H | H | H | H |
| L | H | L | H | H | H | H | H | H | H | H | H | H |
| H | H | L | H | H | H | H | H | H | H | H | H | H |
| L | L | H | H | H | H | H | H | H | H | H | H | H |
| H | L | H | H | H | H | H | H | H | H | H | H | H |
| L | H | H | H | H | H | H | H | H | H | H | H | H |
| H | H | H | H | H | H | H | H | H | H | H | H | H |

Fig. 2

APPARATUS FOR DETECTING DATA BITS AND ERROR BITS IN PHASE ENCODED DATA

BACKGROUND OF THE INVENTION

This invention relates to magnetic recording systems and more particularly to apparatus for signaling the number of errors in stored data characters. The apparatus provides a signal to a first output terminal when at least one error occurs in a data character, provides a signal to a second output terminal when only one error occurs in the character and provides a signal to a third output terminal when at least two errors occur in the character.

In modern data processing systems data is stored on magnetic tapes or disks for retrieval and use at a later time. The data which is stored on the magnetic medium includes alphanumeric data characters each of which may include a total of nine bits. When magnetic tape is used the characters are stored or "written" sequentially on a plurality of tracks on the length of the magnetic tape which moves past a magnetic recording head assembly. These characters are recorded transversely along the tape with one bit of a character written on each of the tracks by plurality of magnetic heads on the head assembly. In a nine-track system nine heads simultaneously record nine bits of a data character with one bit in each of the nine tracks. Each bit is either a binary one or a binary zero. A unique combination of binary ones and binary zeros is used to represent each of the data characters which are stored on the tracks of the tape.

When data is read from the magnetic tape, defects in the magnetic tape or noise in the subsystem may cause errors in one or more of the bits of retrieved data. The presence of these errors may be detected by checking the format of the signal in each of the tracks. It is necessary to provide an error signal whenever an error occurs in any of the tracks of data being read from the magnetic tape. Since each of the characters is comprised of a combination of binary ones and binary zeros an error occurs whenever a binary one is incorrectly changed to a binary zero or whenever a binary zero is changed to a binary one. If the track can be located which has developed the error signal the error can be corrected by changing the incorrect binary zero to a binary one or by changing an incorrect binary one to a correct binary zero. When only a single error occurs in the nine tracks containing the nine binary bits which make up a data character, this error can be readily detected and corrected by substituting the proper binary bit.

Prior art circuits detect the errors in the various tracks of the data character and provide a first type of signal when only a single bit in the character is incorrect and provide a second signal when more than one binary bit in a character is incorrect. Such prior art circuits include a large plurality of logic gates and flip-flops. These prior art circuits require a relatively large amount of space in the circuit boards used in the data processing system. What is needed is a more compact type of circuit which will be less expensive, will use fewer parts and require less space in the data processing system.

It is, therefore, an object of this invention to provide a new and improved apparatus for providing a first signal when an error exists in at least one track of a magnetic recording type, to provide a second signal when an error exists in only one track of the magnetic recording tape and to provide a third signal when errors exist in at least two tracks of the magnetic tape.

Another object of this invention is to provide apparatus which delivers a signal to a first output terminal when an error exists in at least one track of a magnetic recording tape, delivers a signal to a second output terminal when an error exists in only one track of the magnetic recording tape and provides a signal to a third output terminal when errors exist in at least two tracks of the tape.

A further object of this invention is to provide a simplified circuit which delivers a signal to a first output terminal when an error exists in at least one track of a magnetic recording tape, delivers a signal to a second output terminal when an error exists in only one track of the tape and provides a signal to a third output terminal when errors exist in at least two tracks of the tape.

Still another object of this invention is to provide a simplified apparatus which uses binary-to-decimal converters to develop a first signal when an error exists in at least one track of a magnetic recording tape, to provide a second signal when an error exists in only one track of a magnetic tape and to provide a third signal when errors exist in at least two tracks of the tape.

SUMMARY OF THE INVENTION

The foregoing objects are achieved in the present invention by providing apparatus which uses binary-to-decimal converters and logic gates to provide a signal to a first output terminal when an error exists in at least one track of a magnetic recording tape, to provide a signal to a second output terminal when the error exists in only one track of the tape and to provide a signal to a third output terminal when errors occur in at least two tracks of the magnetic recording tape.

BRIEF DESCRIPTION OF THE DRAWINGS

FIG. 2 is a table used to explain the operation of the binary-to-decimal converters shown in the circuit of FIG. 1.

DESCRIPTION OF THE PREFERRED EMBODIMENT

Figure 1:
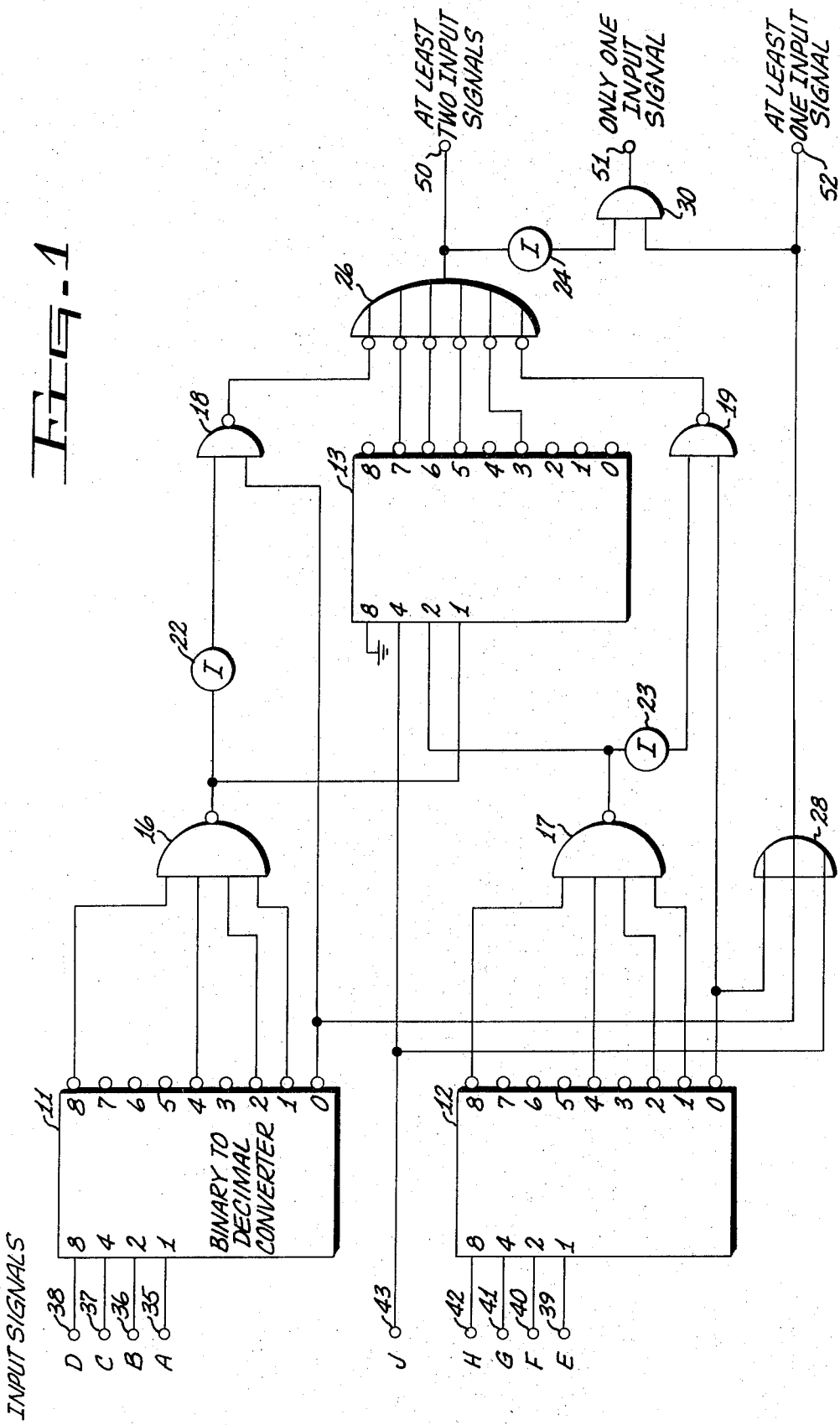
FIG. 1 is a diagram of one embodiment of the present invention.

Each of the magnetic pick-up heads which is adjacent a track of the magnetic recording tape provides signals to an error detector (not shown). Each of these error detectors may be connected to a corresponding one of the signal input terminals 35–43 of the preferred embodiment shown in FIG. 1. When an error occurs in the data retrieved from any one of the tracks of the magnetic tape the error detector provides a positive or high value of signal to a corresponding one of the signal input terminals 35–43. Signals from these terminals are coupled to the input leads of the binary-to-decimal converters 11–13. The binary-to-decimal converter receiving the input signal supplies a warning signal through the logic gates shown in FIG. 1 so that a positive signal is developed at the terminals 51 and 52.

When an error signal occurs in the data in two of the tracks the detectors provide signals to two of the signal input terminals 35–43. The converters supply signals to the logic gate so that a positive signal appears on the "at least two input signals" terminal 50 and the "at least one input signal" terminal 52. Thus, output terminal 52 provides a positive signal when any one or more of the input terminals receives signals from the error detectors. Terminal 50 provides a positive output signal when any two or more of the input terminals receive signals from the error detectors. Output terminal 51 provides a positive signal only when a single error is detected in the data retrieved from the nine tracks of the magnetic tape.

The operation of the binary-to-decimal converters 11–13 can be best understood by referring to the truth table of FIG. 2. When there are no positive input signals applied to any of the terminals A–D of FIG. 1 the converter 11 supplies a low value of output voltage on the zero output lead and a positive or high value of voltage on the remaining output leads 1–8. When a positive or high signal is applied to the A input terminal 35 the positive voltage on the one-input lead causes the converter 11 to supply a low value of signal on the "1" output lead of the converter and a high value of voltage on all of the other output leads. A signal applied on the A and B input terminals causes the converter 11 to supply a low value of voltage on the "3" output lead and a high value of voltage on the remaining output leads. The output signal for other combinations of input signals can be found in the table of FIG. 2. A binary-to-decimal converter which can be used in the present invention is the 7442 which is available from several manufactureres. An internal wiring diagram of the 7442 can be found in the book "Fairchild TTL Family October 1970" by Fairchild Semiconductor, Mountain View, California.

Signals from the output leads of the converters 11–13 are coupled through a plurality of logic gates and inverters to the output terminals 50–52. These logic gates include an AND-gate 30 which provides a logical operation of conjunction for binary signals applied thereto. In the system disclosed, the binary one is represented by a positive signal, the AND-gate provides a positive output signal representing a binary one, when and only when, all of the input signals applied thereto are positive and represent binary ones. When either of the input signals are low, representing a binary zero the output of the AND-gate represents a binary zero. The OR-logic signals are developed by the OR-gate 28 which provides the logical operation of inclusive-OR or positive signals applied thereto. The OR-gate provides an output signal representing a binary one, when any one or more of the input signals applied thereto represent a binary one. When none of the input signals represent a binary one, the output signal represents a binary zero.

The inverters 22–24 each provide the logical operation of inversion for input signals applied thereto. The inverter provides a positive output signal representing a binary one when the input signal applied thereto is low, representing a binary zero. Conversely, the inverter provides an output signal representing a binary zero when the input signal represents a binary one. The NAND-dates 16 and 17 disclosed in FIG. 1 each provide a logical NAND function for input signals applied to its input leads. The NAND-gate provides an output signal representing a binary zero, when and only when, all of the input signals applied to its input leads are positive and represent binary ones. Conversely, the NAND-gate provides a positive output signal representing a binary one when any one or more of the input signals applied thereto represent binary zeros. The NOR-gate 26 provides an output signal representing a binary one when any one or more of the input signals applied thereto represent binary zeros. Conversely, the NOR-gate provides a low value of signal representing a binary zero when all of the input signals applied thereto represent binary ones.

When all of the signals to input leads A–J are low the output signals on the "zero" output leads of converters 11 and 12 are low. The value of signal on the zero output leads of converters 11 and 12 coupled to the lower input leads of NAND-gates 18 and 19 respectively causing the signal on the output lead of gate 18 and 19 to each be high. The signals on the output leads of converter 13 are all high so that all of the inputs to NOR-gate 26 are high, thereby causing the voltage on the output lead of gate 26 to be low. Since the input signal on terminal 43 is low and the voltage on the zero output leads of converters 11 and 12 are low the signals to all of the input leads of OR-gate 28 are low, causing gate 28 to provide a low value of signal to output terminal 52 and to the lower input lead of AND-gate 30. The low value of signal on the input lead of AND-gate 30 causes AND-gate 30 to provide a low value of output voltage to the output terminal 51. Therefore, when all of the input voltages 35–52 are low the voltages on the output terminals 50–52 are all low, representing a binary zero.

When any one of the signal on input terminals 35–38 is high and all of the other input signals to terminals 39–43 are low the binary-to-decimal converter 11 supplies the low value of signals to one of the input leads of NAND-gate 16 causing NAND-gate 16 to supply a high value of signal to inverter 22 and to the "1" input lead of converter 13. The high value of signals to the "1" input lead of converter 13 causes converter 13 to provide a low value of voltage on the "1" output terminal of converter 13 and a high value on the remaining output leads. Since the "1" output terminal is not connected to the gate 26 all of the signals to gate 26 from converter 13 have a high value. The high value of voltage on the input lead of inverter 22 is inverted to a low value on the upper input lead of NAND-gate 18 causing gate 18 to supply a high value of voltage to the upper input lead of gate 26. The low values of voltage on the input terminals 39–42 cause the "1–8" output leads of converter 12 to provide a high value of voltage to the input leads of NAND-gate 17. The high value of voltage on the input of NAND-gate 17 causes gate 17 to provide a low value of voltage to the input lead of inverter 23 which provides a high value of voltage to the upper input lead of gate 19. The zero output lead of converter 12 provides a low value of voltage to the lower lead of gate 19 causing gate 19 to provide a high value of voltage to the lower input lead of gate 16. Since all of the input leads of gate 26 have a high value of voltage gate 26 provides a low value of voltage to the output terminal 50. Converter 11 provides a high value of voltage on the "zero" output lead and to OR-gate 28 so that gate 28 provides a high value of voltage to terminal 52.

In a similar manner a high value of signal on any of the input terminals 39–42 cause converter 12 to provide a high value of voltage on the "zero" output lead which is coupled to the upper input lead of gate 28 thereby causing gate 28 to provide a high value of voltage to output terminal 52. If a high value of voltage is applied to the input terminal 43 this is coupled through OR-gate 28 to the output terminal 52. Thus, a positive value of voltage on a single one of any of the input terminals 35–43 causes a positive output signal on output terminal 52. The positive voltage from output terminal 52 is coupled to the lower input lead of AND-gate 30 and a low value of voltage from output terminal 50 is inverted by inverter 24 and applied as a high value of voltage to the upper lead of gate 30, thereby causing gate 30 to provide a high value of voltage on output terminal 51. Thus, a high value of voltage on any one of the input terminals causes the apparatus of FIG. 1 to provide a high value of voltage on output terminals 51 and 52.

When positive signals are applied to any two or more of the input terminals 35–38 the "zero" output lead of converter 11 has a positive voltage which is applied to the lower input lead of gate 18. The remaining converter output leads which are connected to gate 16 each have positive voltages, as shown in FIG. 2, so the voltage on the output lead of 16 has a low value of voltage. This low value of voltage is inverted by inverter 22 and is applied to the upper input lead of AND-gate 18 causing gate 18 to provide a low value of voltage to the upper input lead of gate 26. The low value of voltage on the upper lead of gate 26 causes gate 26 to provide a positive value of voltage to output terminal 50. The high value of voltage on output terminal 50 is inverted by inverter 24 and disables the AND-gate 30 so that the voltage on output terminal 51 has a low value. The positive value of voltage from the "zero" output lead of converter 11 is coupled through OR-gate 28 to output terminal 52 thereby providing a positive output signal on terminal 52.

When a positive signal is applied to one of the input terminals 35–38 and another positive signal is applied to one of the input terminals 29–42 a low value of voltage is applied to one of the input leads of each of the AND-gates 16 and 17 thereby causing the voltage on the output leads of NAND-gates 16 and 17 to each have a positive voltage. The positive voltages from NAND-gates 16 and 17 are applied to input leads "1" and "2" of the converter 13 thereby causing a low value of voltage on the "3" output lead of converter 13. The low value of voltage from the "3" output lead of converter 13 is applied to one of the input leads of gate 26 thereby causing gate 26 to provide a positive voltage on the output terminal 50.

When positive voltages are applied to two or more of the signal input terminals 39–42 positive values of voltages are coupled from each of the output leads of converter 12 to the input leads of gate 17 causing gate 17 to provide a low value of voltage to the input lead of inverter 23. The low value of voltage to the input lead of inverter 23 causes inverter 23 to provide a positive value of voltage to the upper input lead of NAND-gate 19 thereby enabling gate 19. At the same time a positive value of voltage from the "zero" output lead of converter 12 is connected to the lower input lead of gate 19 causing gate 19 to provide a low value of voltage to the lower input lead of gate 26. The low value voltage on the input lead of gate 26 causes gate 26 to provide a positive value of voltage to output terminal 50. The positive value of voltage from the "zero" output lead of converter 12 is coupled through OR-gate 28 to provide a positive voltage on output terminal 52.

When a positive signal is applied to input terminal 43 and another positive signal is applied to one of the input terminals 35–38 converter 11 supplies a low value of voltage to one of the input leads of gate 16, causing gate 16 to provide a high value of voltage to the "1" input lead of converter 13. THe positive voltage on the "1" input lead of converter 13 from gate 16 and the positive voltage on the "4" input lead of converter 13 cause converter 13 to supply a low value of voltage on the "b 5" output lead of converter 13. The low value of voltage on the "5" output lead of converter 13 causes gate 26 to provide a high value of signal to output terminal 50. At this same time a positive value of voltage from "zero" output lead of converter 11 is coupled through gate 28 to the output terminal 52.

When a positive signal is coupled to the input terminal 43 and a second positive voltage is applied to one of the input terminals 39–42 converter 12 causes a low value of voltage to be applied to one of the input leads of gate 17 thereby causing gate 17 to provide a high value of voltge to the "2" input lead of converter 13. The positive value of voltage on the "2" input lead of converter 13 and the positive signal on the "4" input lead of converter 13 cause converter 13 to provide a low value of voltage on the "6" output lead. The low value of voltage on the "6" output lead of converter 13 causes NOR-gate 26 to provide a positive voltage to output terminal 50. At this same time converter 12 provides a high value of voltage to the "zero" output lead of converter 12. The high value of voltage from the "zero" output lead of converter 12 is coupled through OR-gate 28 to output terminal 52. Additional input signals may be used by adding additional binary to decimal converters and logic NAND-gates such as gate 16 and by using a NOR-gate 26 having additional input leads.

While the principles of the invention have now been made clear in an illustrative embodiment, there will be many obvious modifications of the structure, proportions, materials and components without departing from those principles. The appended claims are intended to cover any such modifications.

What is claimed is:

1. Apparatus for signaling the number of errors in data characters comprising:

first, and second binary-to-decimal converters each having first, second, third and fourth input leads and first, second, third, fourth and fifth output leads;

a third binary-to-decimal converter having first, second, third and fourth input leads and first, second, third and fourth output leads;

a plurality of signal input terminals, a first of said input terminals being connected to said third input lead of said third converter, each of the remainder of said input terminals being connected to a corresponding one of said input leads of said first and said second converters;

first and second logic gates each having first, second, third and fourth input leads and an output lead, said second, third, fourth and fifth output leads of said first converter each being connected to a corresponding one of said input leads of said first gate, said second, third, fourth and fifth output leads of said second converter each being connected to a corresponding one of said input leads of said second gate;

third and fourth logic gates each having first and second input leads and an output lead, said first input lead of said third gate being coupled to said output lead of said first gate, said second input lead of said third gate being connected to said first output lead of said first converter, said first input lead of said fourth logic gate being coupled to said output lead of said second gate, said second input lead of said fourth gate being connected to said first output lead of said second converter; and a fifth logic gate having first, second, third, fourth, fifth and sixth input leads and an output lead, said output lead of said third gate being coupled to said first input lead of said fifth gate, said sixth input lead of said fifth gate being connected to said output lead of said fourth gate, said second, third, fourth and fifth output leads of said third converter each being coupled to a corresponding one of said second, third, fourth, and fifth input leads of said fifth logic gate, said output lead of said first gate being connected to said first input lead of said third converter, said output lead of said second gate being connected to said second input lead of said converter.

2. Apparatus for signaling a number of errors in data characters comprising:

first and second binary-to-decimal converters each having first, second, third and fourth input leads and an output lead;

a logic gate having first, second and third input leads and an output lead, said first input lead of said logic gate being connected to said output lead of said first converter, said second input lead of said logic gate being connected to said output lead of said second converter;

a plurality of signal input terminals, a first of said input terminals being connected to said third input lead of said logic gate, each of the remainder of said input terminals being connected to a corresponding one of said input leads of said first and said second converters.

3. Apparatus for signaling the number of errors in data characters comprising:

first, and second binary-to-decimal converters each having first, second, third and fourth input leads and first, second, third, fourth and fifth output leads;

a third binary-to-decimal converter having first, second, third and fourth input leads and first, second, third and fourth output leads;

a plurality of signal input terminals, a first of said input terminals being connected to said third input lead of said third converter, each of the remainder of said input terminals being connected to a corresponding one of said input leads of said first and said second converters;

first and second logic gates each having first, second, third and fourth input leads and an output lead, said second, third, fourth and fifth output leads of said first converter each being connected to a corresponding one of said input leads of said first gate, said second, third, fourth and fifth output leads of said second converter each being connected to a corresponding one of said input leads of said second gate;

third and fourth logic gates each having first and second input leads and an output lead, said first input lead of said third gate being coupled to said output lead of said first gate, said second input lead of said third gate being connected to said first output lead of said first converter, said first input lead of said fourth logic gate being coupled to said output lead of said second gate, said second input lead of said fourth gate being connected to said first output lead of said second converter;

a fifth logic gate having first, second, third, fourth, fifth and sixth input leads and an output lead, said output lead of said third gate being coupled to said first input lead of said fifth gate, said sixth input lead of said fifth gate being connected to said output lead of said fourth gate, said second, third, fourth and fifth output leads of said third converter each being coupled to a corresponding one of said second, third, fourth, and fifth input leads of said fifth logic gate, said otput lead of said first gate being connected to said first input lead of said third converter, said output lead of said second gate being connected to said second input lead of said converter; and a sixth logic gate having first, second and third input leads and an output lead, said first input lead of said sixth gate being connected to said first output lead of said first converter, said second input lead of said gate being connected to said first output lead of said second converter, said input terminals being connected to said third input lead of said sixth gate.

4. Apparatus for signaling the number of errors in data characters as defined in claim 3 including:

a seventh logic gate having first and second input leads and an output lead, said first input lead of said seventh gate being connected to said output lead of said sixth gate; and an inverter, said inverter being connected between said output lead of said fifth gate and said second input lead of said seventh gate.

* * * * *